United States Patent
Matsuda

(10) Patent No.: US 7,222,904 B2
(45) Date of Patent: May 29, 2007

(54) MULTI-FINGER HAND DEVICE

(75) Inventor: Hiroshi Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/496,442

(22) PCT Filed: Aug. 26, 2002

(86) PCT No.: PCT/JP02/08570

§ 371 (c)(1),
(2), (4) Date: May 20, 2004

(87) PCT Pub. No.: WO03/051583

PCT Pub. Date: Jun. 26, 2003

(65) Prior Publication Data

US 2005/0006915 A1    Jan. 13, 2005

(30) Foreign Application Priority Data

Dec. 17, 2001  (JP) .............................. 2001-382842

(51) Int. Cl.
*B25J 15/10* (2006.01)
(52) U.S. Cl. ..................... 294/111; 294/106; 901/36
(58) Field of Classification Search ................ 294/106, 294/111; 901/31, 36, 39; 623/63, 64; 414/7
See application file for complete search history.

(56) References Cited

U.S. PATENT DOCUMENTS 2,549,716 A * 4/1951 Simpson ...................... 623/64

(Continued)

FOREIGN PATENT DOCUMENTS

DE    19755465    6/1999

(Continued)

OTHER PUBLICATIONS

Microfilm of the specification and drawings annexed to the request of Japanese Utility Model Application No. 7852/1978 (Laid-open No. 112282/1979), Aug. 7, 1979.

*Primary Examiner*—Dean J. Kramer
(74) *Attorney, Agent, or Firm*—Rankin, Hill, Porter & Clark LLP

(57) ABSTRACT

There is provided a multi-finger hand device which can perform smooth bending and stretching operations of finger mechanisms in holding work of an object or the like while reducing the number of actuators as driving sources of the bending and stretching operations of the finger mechanisms. Wires 29*a* and 29*b*, and wires 30*a* and 30*b* extending from the finger mechanisms 2*b* to 2*e* biased to the stretching side by springs 16 or the like are joined to joining element 32 and 33, respectively. A wire 31 provided extensionally from the finger mechanism 2*a* is wound onto a pulley 36 and drawn from the base side of the hand 3. The joining elements 32 and 33 are rockably held by a holding element 43 via spindles 44 and 45. The holding element 43 is provided movably and rockably around a spindle 42. The pulley 36 is held by the holding element 43 and moves together with the holding element 43. By pulling the wire 31, the bending operations of the finger mechanisms 2*a* to 2*e* are performed collectively. During bending and stretching operations of the finger mechanisms 2*a* to 2*e*, even if any of the finger mechanisms touches an object or the like and is disabled to move, the bending and stretching operations of the other finger mechanisms can be performed.

22 Claims, 6 Drawing Sheets

U.S. PATENT DOCUMENTS

| | | | | |
|---|---|---|---|---|
| 2,553,827 A * | 5/1951 | Mason | | 623/64 |
| 2,556,524 A * | 6/1951 | Drennon | | 623/64 |
| 3,413,658 A * | 12/1968 | Becker | | 623/64 |
| 4,364,593 A * | 12/1982 | Maeda | | 294/106 |
| 4,685,929 A * | 8/1987 | Monestier | | 623/64 |
| 6,247,738 B1 * | 6/2001 | Winkel et al. | | 294/111 |
| 6,913,627 B2 * | 7/2005 | Matsuda | | 623/64 |

FOREIGN PATENT DOCUMENTS

| | | |
|---|---|---|
| JP | 50-28551 | 8/1975 |
| JP | 50-32927 | 9/1975 |
| JP | 55-25986 | 6/1980 |
| JP | 60-207795 | 10/1985 |
| JP | 63-251186 | 10/1988 |
| JP | 06-008178 | 1/1994 |
| JP | 6-31983 | 4/1994 |
| JP | 8-300282 | 11/1996 |
| JP | 2002-103269 | 4/2002 |

\* cited by examiner

MULTI-FINGER HAND DEVICE

FIELD OF THE INVENTION

The present invention relates to a multi-finger hand device having a plurality of finger mechanisms.

BACKGROUND ART

A multi-finger hand device having a structure similar to that of a human hand is configured such that a plurality of finger mechanisms are provided extensionally from a hand attached to a tip end of an arm, each having a plurality of interjoint elements sequentially connected via a plurality of finger joints.

In this type of multi-finger hand device, there have been known in the prior art those in which, for each finger mechanism, an actuator for driving the finger joints of the finger mechanism is provided apart from the finger mechanism (for example, in the hand or arm), this actuator is connected to the finger mechanism via a wire element and a pulley element onto which the wire element is wound, and the wire element is pulled by the actuator to allow the finger mechanism to perform bending and stretching operations (for example, refer to Japanese Patent Application Laid-Open No.207795 (1985), Japanese Patent Application Laid-Open No. 8178 (1994) or the like).

However, these conventional multi-finger hand devices, being provided with an actuator for each finger mechanism, can control the bending and stretching operations of the respective finger mechanisms independently, while large space is necessary for mounting a number of actuators. Furthermore, since the wire element connecting the finger mechanism and the actuator corresponding to the same are required for each finger mechanism, space for arranging a number of wire elements is also necessary and the arrangement of the wire elements becomes complicated.

In order to solve such inconveniences, it can be considered that, for example, the respective finger mechanisms are biased via springs or the like toward their stretching side or bending side, that the wire elements provided extensionally from the respective finger mechanisms are combined with each other, and that the combined wire elements are pulled by a single actuator, whereby bending operations or stretching operations of the respective finger mechanisms can be performed collectively.

However, in such a case, for example, when the bending operations of the respective finger mechanisms are performed to hold an object, and one of the finger mechanisms touches the object or another obstacle, thereby being disabled to perform the bending operation further, the other finger mechanisms may also be disabled to perform their bending operations further, thereby being disabled to hold the object properly. Furthermore, in a case where the respective finger mechanisms are stretched from the bending state, when one of the finger mechanisms touches an obstacle or the like, thereby being disabled to perform the stretching operation further, the other finger mechanisms are also disabled to perform the stretching operations.

The present invention is achieved in view of the above-mentioned background, and it is an object of the present invention to provide a multi-finger hand device which bends and stretches a plurality of finger mechanisms via wire elements, wherein smooth bending and stretching operations of the finger mechanisms can be performed in holding work of an object or the like while reducing the number of actuators as driving sources of the bending and stretching operations of the finger mechanisms.

DISCLOSURE OF THE INVENTION

In order to achieve such an object, according to a first aspect of the present invention, there is provided a multi-finger hand device comprising: a hand attached to a tip end of an arm; a plurality of finger mechanisms provided extensionally from the hand each of which is structured to sequentially connect a plurality of interjoint elements via finger joints; biasing means for biasing the respective finger mechanisms to any one of the stretching direction and the bending direction; wire elements provided extensionally from the respective finger mechanisms to the hand side; and driving means for performing bending operations or stretching operations of the finger mechanisms by pulling the wire elements provided extensionally from the respective finger mechanisms against biasing forces of the biasing means, wherein: the driving means comprises a joining element having a pair of joining portions which join ends on the hand side of the two wire elements provided extensionally from at least two finger mechanisms of the plurality of finger mechanisms respectively with a space left therebetween, and a holding element which rockably holds the joining element via a supporting point provided between both the joining portions of the joining element and can move in a pulling direction of the two wire elements; and when the bending operations or the stretching operations of the two finger mechanisms are performed, the wire elements provided extensionally from the two finger mechanisms are pulled by moving the holding element.

The first aspect of the present embodiment has a structure suited for bending and stretching at least two finger mechanisms. Hereinafter, a description will be given supposing that two finger mechanisms are used. The finger mechanisms are provided, for example, with a plurality of joints and extend so as to bend and stretch freely by imitating a human hand. The wire elements extend from the respective finger mechanisms toward the hand, and by pulling the wire elements, the bending operations and the stretching operations of the respective finger mechanisms can be performed. The driving means pulls both the wire elements provided extensionally from the two finger mechanisms concurrently via the joining element held by the holding element against the biasing forces of the biasing means, thereby performing the bending operations or the stretching operations of the two finger mechanisms (hereinafter referred to only as bending and stretching operations). Accordingly, with respect to the two finger mechanisms, the bending and stretching operations of both the finger mechanisms can be performed by only one actuator instead of providing one actuator for each of the finger mechanisms. Furthermore, at this time, even if any one of the two finger mechanisms touches an object or the like and the wire element thereof is disabled to be pulled, the joining element can rock like a scale via the supporting point and move together with the holding element while pulling the wire element of the other finger mechanism, whereby the bending and stretching operations of the other finger mechanism can be performed without any problem.

In this way, according to the first aspect of the present invention, the smooth bending and stretching operations of the finger mechanisms in holding work of an object or the like can be performed while reducing the number of the actuators as driving sources of the bending and stretching operations of the finger mechanisms. Incidentally, the first aspect of the present invention can also be employed in the case of two or more finger mechanisms, and with respect to the finger mechanisms other than the two finger mechanisms, the wire elements provided extensionally from the finger mechanisms may be pulled using individual actuators to perform the bending and stretching operations of the finger mechanisms. Alternatively, according to other structures of the present invention as described later, the bending and stretching operations can be performed using an actuator common to each other.

Furthermore, according to a second aspect of the present invention, there is provided a multi-finger hand device comprising: a hand attached to a tip end of an arm; at least four or more finger mechanisms provided extensionally from the hand each of which is structured to sequentially connect a plurality of interjoint elements via finger joints; biasing means for biasing the respective finger mechanisms to any one of the stretching direction and the bending direction; wire elements provided extensionally from the respective finger mechanisms to the hand side; and driving means for performing bending operations or stretching operations of the finger mechanisms by pulling the wire elements provided extensionally from the respective finger mechanisms against biasing forces of the biasing means, wherein: the driving means comprises two joining elements each having a pair of joining portions wherein at least four finger mechanisms of the plurality of finger mechanisms are classified into two pairs and the joining portions join ends on the hand side of the two wire elements provided extensionally from the two finger mechanisms of each of the two pairs with a space left therebetween, and a holing element which rockably holds the two joining elements with a space left therebetween via supporting points each provided between both the joining portions in each of the joining elements and can move in a pulling direction of the wire elements provided extensionally from the four finger mechanisms respectively and can rock around a supporting point provided between the two joining elements; and when the bending operations or the stretching operations of the four finger mechanisms are performed, the wire elements provided extensionally from the four finger mechanisms are pulled by moving the holding element.

The second aspect of the present invention has a structure suited for bending and stretching at least four finger mechanisms. Hereinafter, a description will be given supposing that four finger mechanisms are used. The driving means according to the second aspect of the present invention can pull the wire elements provided extensionally from the four finger mechanisms via the two joining elements against the biasing forces of the biasing means by moving the holding element. Thereby, the bending and stretching operations of the four finger mechanisms can be performed collectively, and the bending and stretching operations can be performed using a single actuator instead of providing actuators for the four finger mechanisms individually.

Here, the four finger mechanisms are classified into the two pairs and the respective wire elements are joined by the two joining elements. In other words, a pair of wire elements extended from the two finger mechanisms are joined by one of the joining elements, and a pair of wire elements extended from the remaining two finger mechanisms are joined by the other joining element. Then, even if any one of the four finger mechanisms touches an object or the like and is disabled to move, so that the wire element thereof becomes incapable of being pulled, the wire element provided extensionally from the finger mechanism paired with the finger mechanism which is disabled to move is pulled by the balance-like rocking of the joining element, and the bending and stretching operations of the finger mechanism paired with the finger mechanisms which is disabled to move can be performed without any problem. In addition, since the joining element corresponding to the two finger mechanisms of the pair other than the pair to which the finger mechanism disabled to move belongs is moved together with the holding element, the bending and stretching operations of the three finger mechanisms other than the finger mechanism disabled to move can be performed. This is also similar in a case where one finger mechanism belonging to one of the two pairs of the four finger mechanisms and one finger mechanism belonging to the other pair are disabled to move at the same time. In this case, both the joining elements can also move together with the holding element while rocking, whereby the bending and stretching operations of the two finger mechanisms other than the two finger mechanisms disabled to move can be performed.

Furthermore, in a case where both of the two finger mechanisms belonging to one of the two pairs of the four finger mechanisms are disabled to move, the joining element corresponding to the finger mechanisms belonging to the pair is disabled to move together with the holding element, however, rocking of the holding element around the supporting point enables the joining element corresponding to the finger mechanisms of the other pair to move together with the holding element. Thereby, the bending and stretching operations of the finger mechanisms of the other pair can be performed. Similarly, even in a case where three finger mechanisms of the four finger mechanisms are disabled to move, since the joining element corresponding to one movable finger mechanism rocks and the holding element can move while rocking, the bending and stretching operations of the one movable finger mechanism can be performed.

In this way, according to the second aspect of the present invention, even if any finger mechanism of the four finger mechanisms touches an object or the like and is disabled to move, the remaining finger mechanisms can perform the bending and stretching operations. Then, the bending and stretching operations of the four finger mechanisms can be performed by moving the pulley holding element using a single actuator.

Hence, according to the second aspect of the present invention, similar to the above-mentioned first embodiment, the smooth bending and stretching operations of the finger mechanisms in holding work of an object or the like can be performed while reducing the number of the actuators as driving sources of the bending and stretching operations of the finger mechanisms. Incidentally, in the second aspect, the basic actuation of the two finger mechanisms of each of the pairs is similar to that of the first aspect.

Furthermore, the above-mentioned multi-finger hand device of the first aspect of the present invention comprises at least three or more said finger mechanisms, wherein: the driving means comprises a pulley element onto which the wire element provided extensionally from the one finger mechanism other than the two finger mechanisms is wound and which is held rotatably by the holding element; and when the bending operations or the stretching operations of the two finger mechanisms and the one other finger mechanism are performed, the wire element provided extensionally from the one other finger mechanism is pulled in such a direction that the pulley element moves in a pulling direction of the wire elements provided extensionally from the two finger mechanisms together with the holding element.

Thereby, by pulling the wire element provided extensionally from the one other finger mechanism, the bending and stretching operations of the one other finger mechanism are performed. In addition, by pulling the wire element provided extensionally from the one other finger mechanism, the holding element moves via the pulley element, and with this, the wire elements provided extensionally from the two finger mechanisms are pulled via the joining element. Thereby, only by pulling the wire element provided extensionally from the one other finger mechanism, the bending and stretching operations of not only the one other finger mechanism but the two finger mechanisms can be performed concurrently.

At this time, for example, even if the one other finger mechanism touches an object or the like and goes into an unmovable state, since the pulley element is provided in the movable holding element, the holding element is moved while the pulley element rotates, and the wire elements of the two finger mechanisms are pulled, so that with respect to the two finger mechanisms, the bending and stretching operations can be performed without any problem.

Furthermore, as for the two finger mechanisms, even if any one of them touches an object or the like and is disabled to move, the joining element rocks like a scale, so that the bending and stretching operations of the other finger mechanism is not inhibited, and further, since the wire element provided extensionally from the one other finger mechanism is pulled via the pulley element of the holding element, the bending and stretching operations of the one other finger mechanism are also performed without any problem.

Hence, according to the above-mentioned present invention, even if any finger mechanism of the three finger mechanisms consisting of the two finger mechanisms and the one other finger mechanism touches an object or the like and is disabled to move, the remaining finger mechanisms can perform the bending and stretching operations. In addition, the bending and stretching operations of the three finger mechanisms can be performed by the wire element provided extensionally from the one other finger mechanism using the single actuator.

Similar to the foregoing case, in the above-mentioned second aspect of the present invention, the multi-finger hand device comprises at least five or more said finger mechanisms, wherein: the driving means comprises a pulley element onto which the wire element provided extensionally from the one finger mechanism other than the four finger mechanisms is wound and which is held rotatably by the holding element between the two joining elements; and when the bending operations or the stretching operations of the four finger mechanisms and the one other finger mechanism are performed, the wire element provided extensionally from the one other finger mechanism is pulled in such a direction that the pulley element moves in a pulling direction of the wire elements provided extensionally from the four finger mechanisms together with the holding element.

Thereby, only by pulling the wire element provided extensionally from the one other finger mechanism, the bending and stretching operations of the four finger mechanisms can be performed concurrently with the bending and stretching operations of the one other finger mechanism. In other words, by pulling the wire element provided extensionally from the one other finger mechanism, the holding element is moved via the pulley element, and the wire elements provided extensionally from the four finger mechanisms are pulled via the two joining elements provided in the holding element. At this time, for example, even if the one other finger mechanism touches an object or the like and goes into an unmovable state, since the pulley element is held by the movable holding element, the holding element is moved while the pulley element rotates, and the wire elements of the four finger mechanisms joined to the two joining elements are pulled, so that with respect to the four finger mechanisms, the bending and stretching operations can be performed without any problem. Furthermore, as for the four finger mechanisms, even if any of them touches an object or the like and is disabled to move, since the joining element corresponding to the remaining finger mechanisms other than the finger mechanism disabled to move can rock like a scale and move together with the holding element, the bending and stretching operations of the remaining finger mechanisms can be performed.

Hence, according to the above-mentioned present invention, even if any finger mechanism of the five finger mechanisms consisting of the four finger mechanisms and the one other finger mechanism touches an object or the like and is disabled to move, the remaining finger mechanisms can perform the bending and stretching operations. In addition, the bending and stretching operations of the five finger mechanisms can be performed by pulling the wire element provided extensionally from the one other finger mechanism using the single actuator.

Furthermore, in the second aspect of the present invention, even if the biasing forces of the respective biasing means are set to a constant value, by locating the supporting point of the holding element provided between the two joining elements closer to any one of the joining elements, the bending and stretching operation sequence of the two finger mechanisms belonging to one of the two pairs of the four finger mechanisms and the two finger mechanisms belonging to the other can be set easily. Specifically, for example, when the biasing means of the respective finger mechanisms have the same biasing force and the holding element is moved via the supporting point, firstly, the holding element rocks, and one of the joining elements at a shorter distance from the supporting point starts to move at an earlier timing than the other joining element at a longer distance from the supporting point. At this time, in a case where the respective biasing means bias the respective finger mechanisms to the stretching side, since the wire elements joined to the one joining element moved at an earlier timing are pulled earlier than the wire elements joined to the other joining element, the bending operations of the two finger elements belonging to the one can be started earlier than those of the two finger elements belonging to the other. Furthermore, in a case where the respective biasing means bias the respective finger mechanisms to the bending side, since the wire elements joined to the one joining element moved at an earlier timing are released earlier than the wire elements joined to the other joining element, the two finger mechanisms belonging to the one can start the stretching operations later than the two finger mechanisms belonging to the other. In this way, since the bending and stretching operation sequence of the finger mechanism can be set by the supporting point position of the holding element, cost increase can be prevented by using biasing means having the same biasing force without mounting biasing means having a different biasing force for each finger mechanism.

Furthermore, in the first and second aspects of the present invention, by locating the supporting point provided between the both joining portions of the joining element closer to any one of the joining portions, the bending and stretching operation sequence can be set easily with respect to the two finger mechanisms. This is basically similar to the above-mentioned case of the supporting point position of the holding element, and when the holding element is moved, the joining element rocks around the supporting point and the wire element joined to one joining portion at a shorter distance from the supporting point is pulled at an earlier timing than the wire element joined to the other joining portion at a longer distance from the supporting point.

In addition, for example, in the multi-finger hand device of the present invention, when the four finger mechanisms correspond to an index finger to a little finger by imitating a human hand, by combining the supporting point position of the joining element and the supporting point position of the holding element, the bending operations from the little finger to the index finger can be continued with a slight sequential delay, so that a natural gripping operation imitating a human hand can be achieved easily.

Furthermore, in the present invention, it is preferable that the joining element is held by the holding element via a link element provided consecutively and rockably to the holding element. Thereby, even when the holding element is provided closer to the arm in the hand, the joining element can be made closer to the respective finger mechanisms by the link element, whereby the length of the respective wire elements is saved to reduce cost. In addition, the rockable link element can absorb a circular arc activation when the holding element rocks around the supporting point thereof to transmit it as a substantially linear operation to the joining element, and the stable bending and stretching operations of the finger mechanisms can be performed.

Furthermore, in the present invention, the wire elements provided extensionally from the respective finger mechanisms, for example, may be provided extensionally from the tip ends of the respective finger mechanisms, however, as a more preferable structure, it is cited that at least one finger mechanism of the plurality of the finger mechanisms comprises a link mechanism joined to the plurality of interjoint elements of the finger mechanism, so that rotational operations around the other finger joints are performed in conjunction with a rotational operation of the interjoint element continued into the finger joint closest to the hand around the finger joint, and the wire element provided extensionally from the finger mechanism is provided extensionally from the interjoint element closest to the hand.

According to this, with respect to the respective finger mechanisms comprising the link mechanism, by pulling the wire element provided extensionally from the interjoint element closest to the hand and rotating the interjoint element closest to the hand around the finger joint closest to the hand, the bending and stretching of the other joints are performed in conjunction with this, and the bending and stretching operations of the finger mechanism are performed. The wire element, therefore, needs only to be extended from the hand to the interjoint element closest to the same, which allows the length thereof to be shorter. Thereby, the length of the wire element can be saved to reduce cost.

Furthermore, it is preferable that the two or more interjoint elements of each of the two or more finger mechanisms among the plurality of finger mechanisms have an identical structure.

According to this, since the two or more finger mechanisms can use the same interjoint element, required components of the multi-finger hand device can be reduced in type, which makes the component management, maintenance or the like easier.

Furthermore, in the present invention, in a case where the hand is provided rotatably around a shaft center extending in a substantially longitudinal direction of the arm, it is preferable that the driving means comprises at least one driving wire element provided extensionally from the hand to the inside of the arm, and an actuator for applying to the driving wire element a driving force for pulling the driving wire element toward the inside of the arm, the driving means transmitting the force of pulling the wire elements provided extensionally from the respective finger mechanisms from the actuator to the hand side via the driving wire element, and the driving wire element is arranged into the arm along the rotation shaft center of the hand.

According to this, since the driving wire element is arranged into the arm along the rotation shaft center of the hand, even if the hand is rotated with respect to the arm, the driving wire element is not pulled. Accordingly, the hand can be rotated with respect to the arm while maintaining bending and stretching states of the finger mechanisms provided extensionally from the hand. Furthermore, by arranging the actuator inside of the arm, the structure of the hand can be downsized.

Incidentally, in the case where the multi-finger hand device comprises, for example, five finger mechanisms, as in the above-mentioned invention of the second aspect, when the pair of joining elements and the pulley element are provided, the driving wire element is integral with the wire element provided extensionally from the one other finger mechanism or made of only one wire element obtained by connecting with the wire element.

Then, in this way, in the multi-finger hand device of the present invention in which the hand rotates with respect to the arm, it is preferable that the arm and the hand are insulated electrically and the driving wire element is formed of an insulating material.

According to this, even if the hand and the finger mechanisms are immersed in water, electric leakage from an electrical component system inside of the arm or the like to the hand side, or the like never occurs. Therefore, work such as holding an object in water can be performed by the multi-finger hand device without any problem.

Incidentally, in the present invention as described above, in the case where the finger mechanisms are biased to the stretching side by the biasing means, a force when holding an object by the multi-finger hand device can be adjusted by controlling the pulling force of the wire elements provided extensionally from the respective finger mechanisms, and in the case where the respective finger mechanisms are biased to the bending side by the biasing means, the force when holding an object can be adjusted by adjusting the biasing force of the biasing means.

Furthermore, in the present invention as described above, the "wire element" includes elements such as chains and belts as well as wires in a typical sense, and the "pulley element" includes gears, sprockets or the like as well as pulleys in a typical sense.

BEST MODE OF CARRYING OUT THE INVENTION

One embodiment of a multi-finger hand device of the present invention will be described in reference to FIGS. 1 to 6. Incidentally, the present embodiment corresponds to both of the first aspect and the second aspect according to the present invention.

Figure 1:
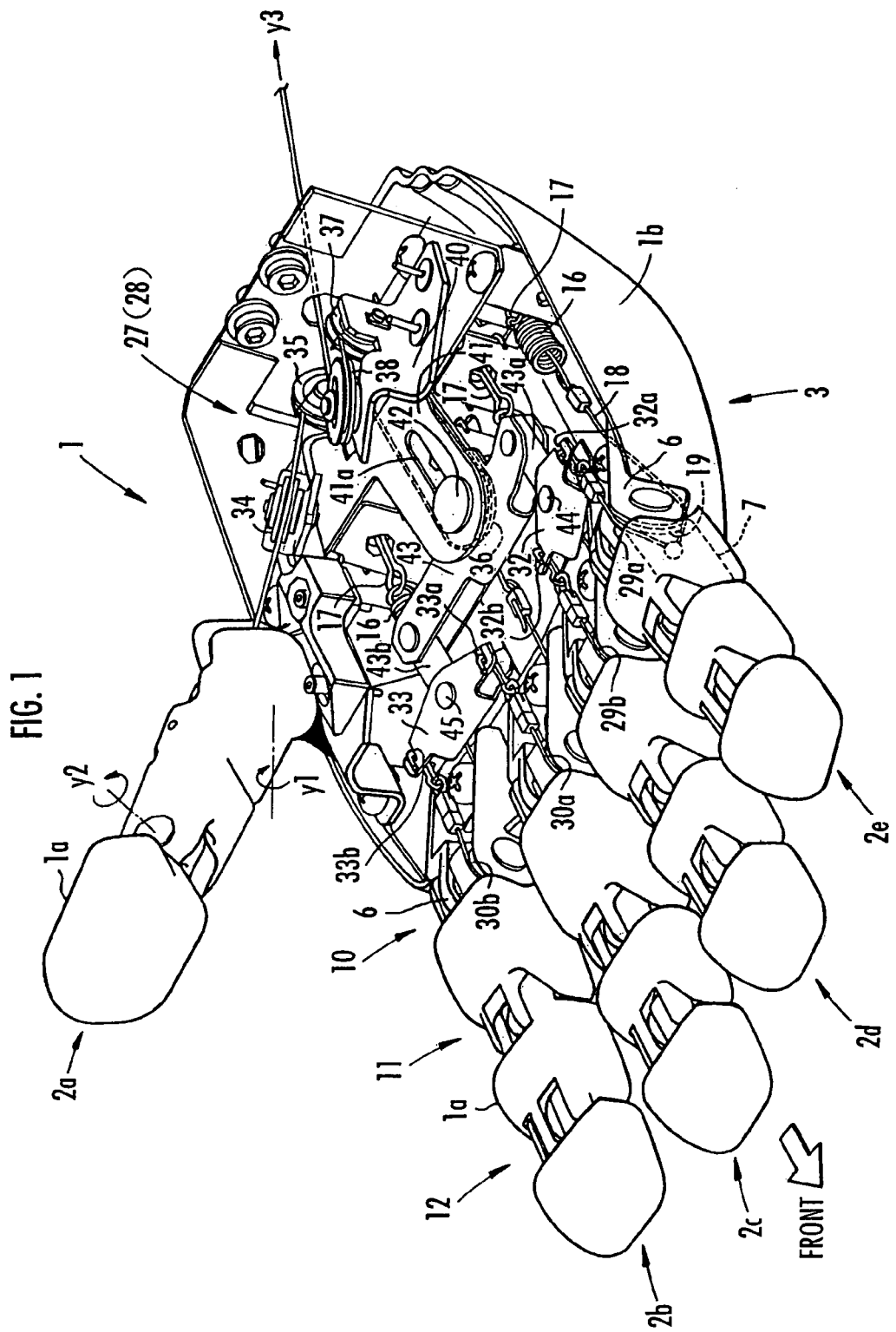
FIG. 1 is a perspective view of a multi-finger hand device according to one embodiment of the present invention.
Figure 4:
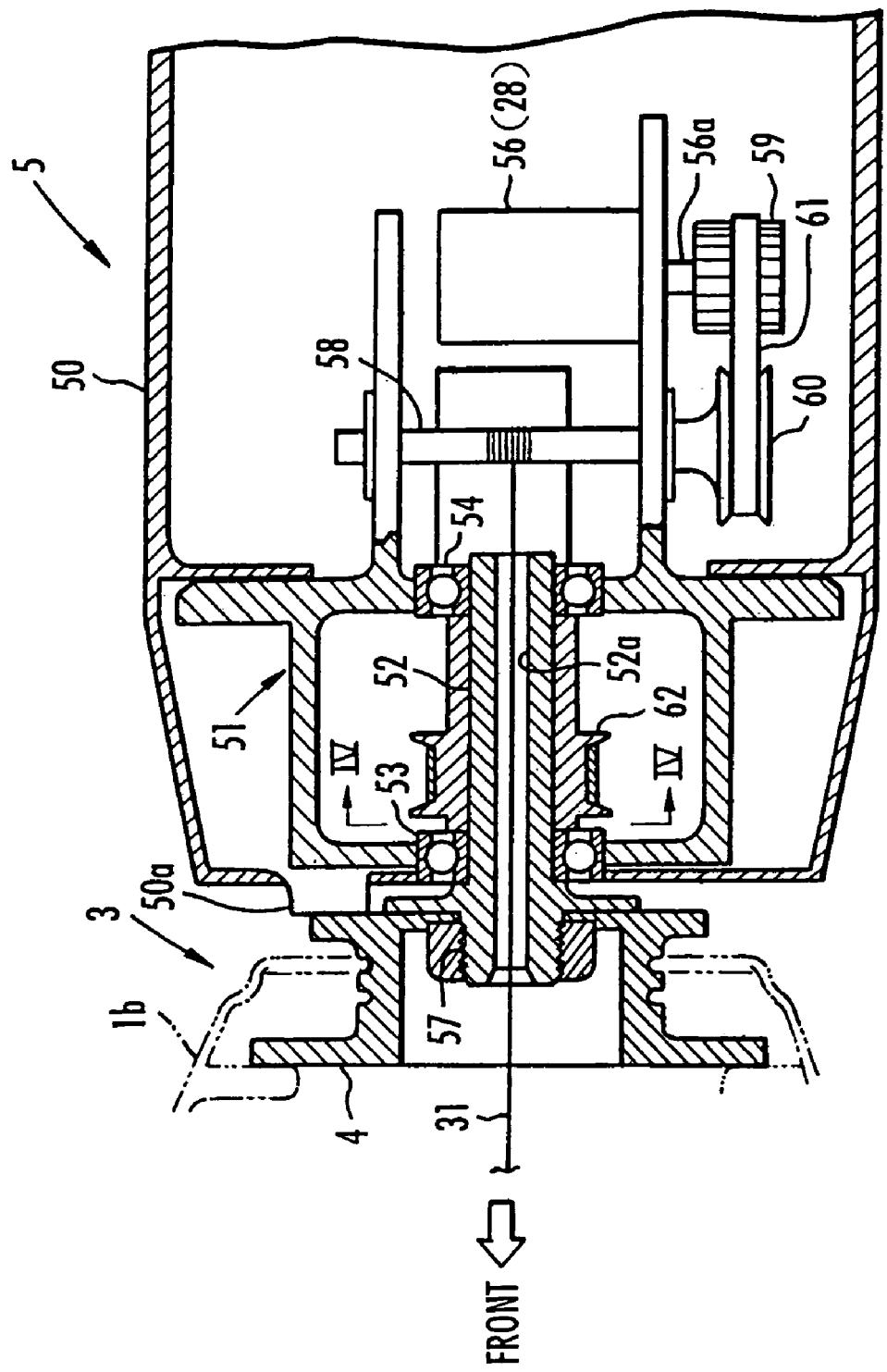
FIG. 4 is a cross-sectional view showing an internal structure of an arm with the multi-finger hand device of FIG. 1 attached.

As shown in FIG. 1, a multi-finger hand device 1 according to the present embodiment is formed by imitating a human hand, comprising five finger mechanisms 2a to 2e corresponding to five fingers and a hand 3 corresponding to a palm. The finger mechanisms 2a to 2e correspond to a thumb, index finger, middle finger, ring finger, and little finger in a human hand, respectively. The hand 3 is joined rotatably via a wrist base 4 to an arm 5, a part of which is shown in FIG. 4. The arm 5 is provided in a robot body of a humanoid or the like, which is not shown in the figure.

Here, as shown in FIG. 1, each of the finger mechanisms 2a to 2e is covered with a finger cover element 1a in such a manner as to bend and stretch. The hand 3 is covered with an element for back of hand formation 1b on the side of a back of hand and with an element for palm formation not shown in the figure on the side of a palm. In the drawings of the present embodiment including FIG. 1, the drawing of the element for palm formation is omitted in order to illustrate an internal structure of the hand 3. In FIG. 1, the element for back of hand formation 1b is located in the lower part of the hand 3, while the element for palm formation is assembled on the upper side of this element for back of hand formation 1b.

Figure 2:
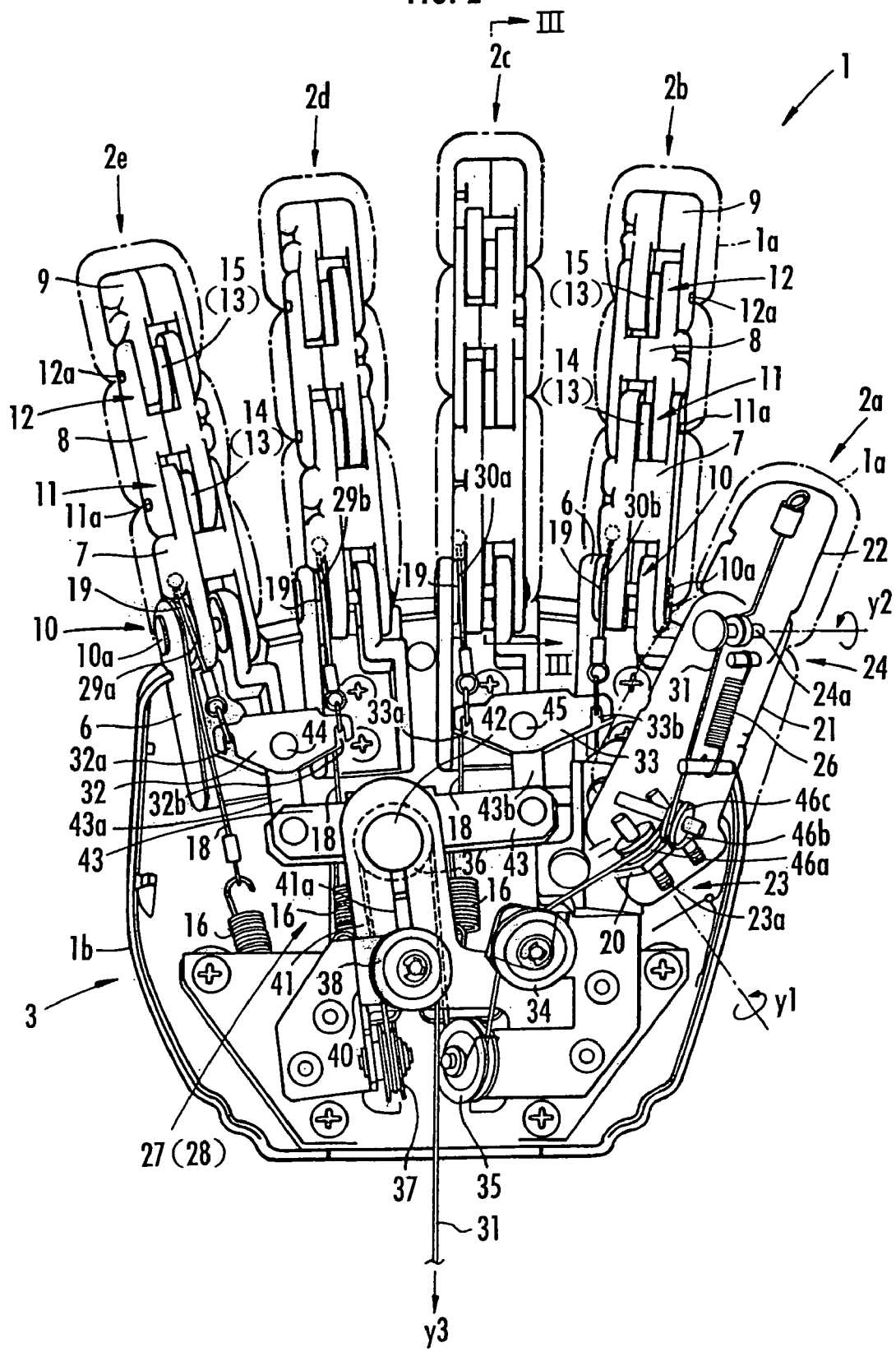
FIG. 2 is a plan view showing a substantial part structure of the multi-finger hand device of FIG. 1.

Among the finger mechanisms 2a to 2e, the four finger mechanisms 2b to 2e except for the finger mechanism 2a corresponding to the thumb are identical in fundamental structure. Firstly, the structure related to these four finger mechanisms 2b to 2e will be described below. As shown in FIG. 2, each of these four finger mechanisms 2b to 2e has a structure that a fixing element 6 which is provided fixedly to an end of the element for back of hand formation 1b of the hand 3 (an end on the opposite side of the arm 5) and three interjoint elements, that is, first to third elements 7, 8 and 9 are connected via three joints, that is, first to third joints 10 to 12 in order. Incidentally, since the fundamental structures of the finger mechanisms 2b to 2e are identical to each other as described above, in respective drawings of the present embodiment, for only some finger mechanisms of the finger mechanisms 2b to 2e, reference numerals and signs of their components (interjoint elements, joints and the like) will be representatively described, and those of other finger mechanisms will be omitted.

The joints 10 to 12 of the respective finger mechanisms 2b to 2e are joints each of which performs a relatively rotational operation around a uniaxis between the elements which the joint joins, and has joint shafts 10a to 12a. These joint shafts 10a to 12a extend in parallel with each other in a substantially width direction of the hand 3 (a direction in which the finger mechanisms 2b to 2e are substantially in parallel). Then, the first joint 10 joins the fixing element 6 and the first interjoint element 7 via the joint shaft 10a in such a manner that the element 7 can rotate around a shaft center of the joint shaft 10a with respect to the fixing element 6, the second joint 11 joins the first interjoint element 7 and the second interjoint element 8 via the joint shaft 11a in such a manner that the element 8 can rotate around a shaft center of the joint shaft 11a with respect to the element 7, and the third joint 12 joins the second interjoint element 8 and the third interjoint element 9 via the joint shaft 12a in such a manner that the element 9 can rotate around a shaft center of the joint shaft 12a with respect to the element 8. These relative rotational operations of the interjoint elements 7 to 9 in the respective joints 10 to 12 enable the bending and stretching operations of the respective finger mechanisms 2b to 2e.

Furthermore, each of the finger mechanisms 2b to 2e is provided with a link mechanism 13 which conjunctionally rotates the second interjoint element 8 and the third interjoint element 9 when the first interjoint element 7, which is closest to the hand 3, is rotated with respect to the fixing element 6.

The structures of these link mechanisms 13 are identical to each other with respect to any of finger mechanisms 2b to 2e, and for these structures, for example, the finger mechanism 2c will be described in reference to FIG. 3. The link mechanism 13 comprises a link arm 14 which joins the fixing element 6 and the second interjoint element 8, and a link arm 15 which joins the first interjoint element 7 and the third interjoint element 9. One end of the link arm 14 is supported rotatably by the fitting element 6 via a spindle 14a at a position closer to a face portion on the back side of the finger mechanism 2c (lower portion in FIG. 3) than the joint shaft 10a of the first joint 10, and the other end thereof is supported rotatably by the second interjoint element 8 via a spindle 14b at a position closer to a face portion on the belly side of the finger mechanism 2c (upper portion in FIG. 3) than the joint shaft 11a of the second joint 11.

Furthermore, one end of the link arm 15 is supported rotatably by the first interjoint element 7 via a spindle 15a at a position closer to a face portion on the back side of the finger mechanism 2c than the joint shaft 11a of the second joint 11, and the other end thereof is supported rotatably by the third interjoint element 9 via a spindle 15b at a position closer to a face portion on the belly side of the finger mechanism 2c than the joint shaft 12a of the third joint 12.

Figure 3:
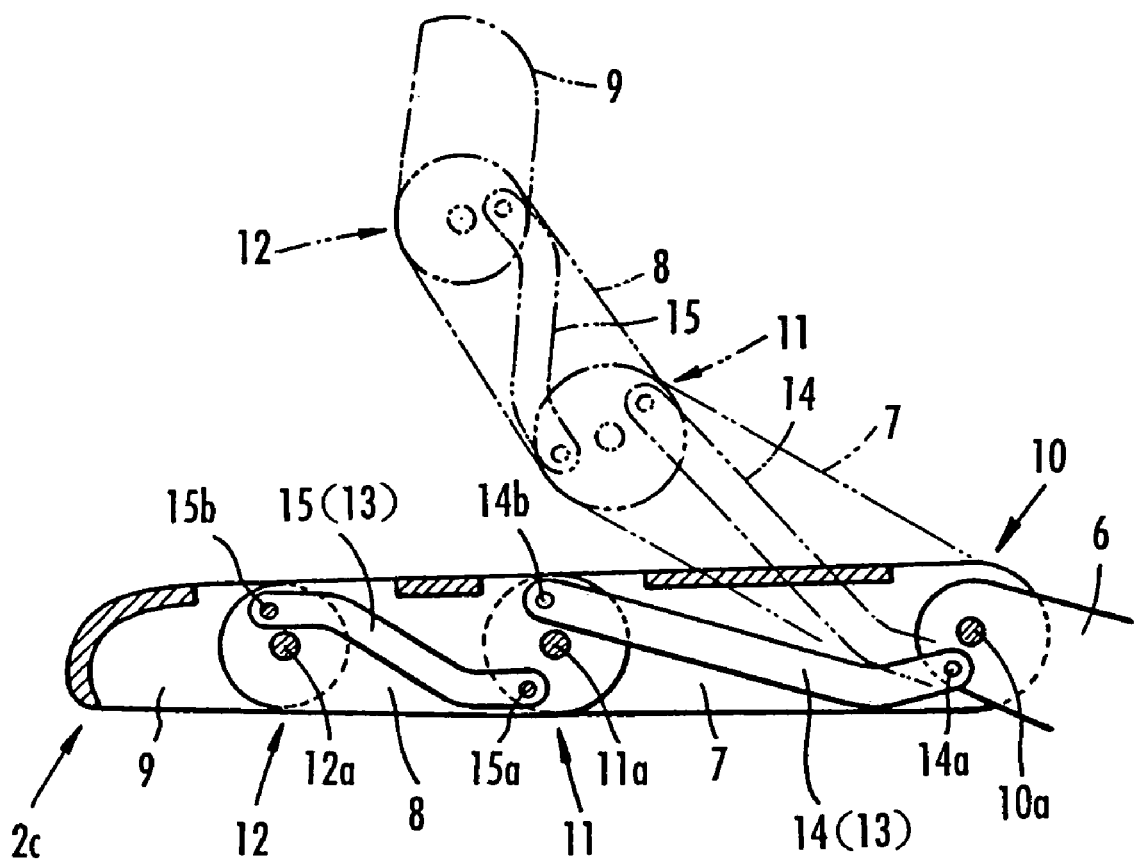
FIG. 3 is a cross-sectional view taken along the line III—III of FIG. 2.

In the finger mechanism 2c comprising the link mechanism 13 having such a structure, when the first interjoint element 7 is rotated in a clockwise direction (direction in which the face portion on the belly side of the first interjoint element 7 approaches a face portion on the palm side of the hand 3) with respect to the fixing element 6 from a state in which the finger mechanisms 2c is stretched as shown in solid lines in FIG. 3, the second interjoint element 8 conjunctionally rotates in a clockwise direction with respect to the first interjoint element 7 as shown in virtual lines of the same figure, and the third interjoint element 9 rotates in a clockwise direction with respect to the second interjoint element 8. Thereby, the finger mechanism 2c bends at the respective joints 10 to 12. Furthermore, on the contrary to the foregoing, when the first interjoint element 7 is rotated in a counterclockwise direction with respect to the fixing element 6 from the state in which the finger mechanism 2c is bent as shown in the virtual lines of the same figure to return to the position shown in the solid lines of the same figure, the second interjoint element 8 and the third interjoint element 9 conjunctionally rotate in counterclockwise directions with respect to the first interjoint element 7 and the second interjoint element 8, respectively to stretch the finger mechanism 2c. In this manner, the bending and stretching of the finger mechanism 2c is performed by rotating the first interjoint element 7 with respect to the fixing element 6.

Such a structure of the link mechanism 13 and the bending and stretching operations of the finger mechanism entailed by the same are completely similar with respect to the finger mechanisms 2b, 2d and 2e.

Incidentally, according to the present embodiment, parts of the finger mechanisms 2b to 2e from the second joint 11 to the finger tip side (parts each made of the second interjoint element 8, the third interjoint element 9, the third joint 12, and the link arm 15) are identical to each other not only in fundamental structure but also in shape and size of each component.

In reference to FIGS. 1 and 2, a spring 16 as biasing means for biasing each of the finger mechanisms 2b to 2e of the above-mentioned structure to the stretching side is arranged inside of the hand 3 for each of the finger mechanisms 2b to 2e. Incidentally, in FIG. 1, a part of the spring 16 of the finger mechanism 2b and the spring 16 of the finger mechanism 2e are shown, and in FIG. 2, the spring 16 of the finger mechanisms 2c to 2e are partially shown.

One end of the spring 16 is latched onto a spring locking part provided in the element for back of hand formation 1b, which is not shown in the figure, via a latch element 17 (partially shown in FIG. 1), and as shown in FIG. 2, the other end thereof is locked onto the corresponding first interjoint element 7 of the finger mechanisms 2b to 2e via a wire element for biasing 18. In this case, a guide pulley 19 which is rotatable around the joint shaft 10a is arranged concentrically with the joint shaft 10a at a position closer to a side face of the first joint 10 of each of the finger mechanisms 2b to 2e, and the wire element for biasing 18 is fixed to a side face portion of the first interjoint element 7 via an outer periphery on the lower side of this guide pulley 19 (the back side of each of the finger mechanisms 2b to 2e). Incidentally, the fixing portion of the wire element for biasing 18 with respect to the first interjoint element 7 is located on upper side than a lower end of the guide pulley 19 in a vertical direction.

This structure allows each of the mechanisms 2b to 2e to be biased in the state in which each of the finger mechanisms 2b to 2e are stretched by a biasing force of the corresponding spring 16.

Incidentally, in the description below, for convenience of the description, the extending direction of the finger mechanisms 2b to 2e in the stretching state is referred to as a broadly anteroposterior direction of the multi-finger hand device 1, and the tip end side of the finger mechanisms 2b to 2e is referred to as the front side of the multi-finger hand device 1.

In reference to FIG. 2, the finger mechanism 2a equivalent to the thumb has a structure that a fixing element 20 which is provided fixedly to the element for back of hand formation 1b of the hand 3 at the rear of the fixing element 6 of the finger mechanism 2b and two interjoint elements, that is, first and second elements 21 and 22 are connected consecutively via two joints, that is, first and second joints 23 and 24 in order. Incidentally, in FIG. 2, in order to show an internal structure of the finger mechanism 2a, for the first interjoint element 21 and the second interjoint element 22, only the outlines thereof are shown.

The respective joints 23 and 24 of the finger mechanism 2a are joints each of which performs a relative rotational operation around a uniaxis between the elements which the joint joins, and has joint shafts 23a to 24a. Then, the joint shaft 23a of the first joints 23 are oriented in a slightly inclined direction with respect to the anteroposterior direction of the multi-finger hand device 1, and the joint shaft 24a of the second joint 24 is oriented in a direction substantially orthogonal to the joint shaft 23a of the first joint 23. Then, the first joint 23 joins the fixing element 20 and the first interjoint element 21 via the joint shaft 23a in such a manner that the element 21 can rotate around a shaft center of the joint shaft 23a with respect to the fixing element 20, and the second joint 24 joins the first interjoint element 21 and the second interjoint element 22 via the joint shaft 24a in such a manner that the element 22 can rotate around a shaft center of the joint shaft 24a with respect to the element 21. These relative rotational operations of the interjoint elements 21 and 22 in the respective joints 23 and 24 enable the bending and stretching operations of the finger mechanism 2a.

In this case, as shown in FIGS. 1 to 2, a bending operation from the state that the finger mechanism 2a is stretched is performed as follows. Specifically, when the finger mechanism 2a is bent from the state that the finger mechanism 2a is stretched, the first interjoint element 21 is rotated around the shaft center of the joint shaft 23a of the first joint 23 with respect to the fixing element 20 (the first interjoint element 21 is rotated in a direction of an arrow y1 in FIG. 2) so that the first interjoint element 21 approaches the hand 3 side, and the second interjoint element 22 is rotated around the shaft center of the joint shaft 24a of the second joint 24 with respect to the first interjoint element 21 (the second interjoint element 22 is rotated in a direction of an arrow y2 in FIG. 2) so that a tip end of the second interjoint element 22 approaches the other finger mechanisms 2b to 2e.

As biasing means for biasing this finger mechanism 2a to the stretching side, a spring 26 shown in FIG. 2 and another spring not shown in the figure are provided. One end of the other spring not shown in the figure is locked onto the element for back of hand formation 1b of the hand 3, and the other end thereof is locked onto the first interjoint element 21 on the side closer to a rim of the hand 3 than the joint shaft 23a of the first joint 23. Thereby, the first interjoint element 21 is biased to the stretching side of the finger mechanism 2a (the opposite direction side of the arrow y1 in FIG. 2) by a biasing force of the other spring. Furthermore, one end of the spring 26 shown in FIG. 2 is locked onto the first interjoint element 21, and the other end thereof is locked onto the second interjoint element 22 on the back side of the finger mechanism 2a as compared to the joint shaft 24a of the second joint 24 (almost on right side of the joint shaft 24a in FIG. 2). Thereby, the second interjoint element 22 is biased to the stretching side of the finger mechanism 2a (the opposite direction side of the arrow y2 in FIG. 2) by a biasing force of the spring 26.

As shown in FIGS. 1 and 2, a driving mechanism 27 for performing the bending and stretching operations of the finger mechanisms 2a to 2e configured as the foregoing is included in the hand 3. This driving mechanism 27 makes up driving means 28 of the present invention together with a motor 56 (actuator) described later.

This driving mechanism 27 comprises five wires 29a, 29b, 30a, 30b and 31 (wire elements), two joining elements 32 and 33, and five pulleys 34 to 38.

As shown in FIG. 1, one end of the wire 29a is fixed to the side face portion on the guide pulley 19 side in the first interjoint element 7 of the finger mechanism 2e, and the other end thereof is joined to a first joining portion 32a of the one joining element 32. Although not shown in the figure, similarly, one end of the wire 29b is fixed to a side face portion on the guide pulley 19 side in the first interjoint element 7 of the finger mechanism 2d, and the other end thereof is joined to a second joining portion 32b of the one joining element 32. Similarly, one end of the wire 30a is fixed to a side face portion on the guide pulley 19 side in the first interjoint element 7 of the finger mechanism 2c, and the other end thereof is joined to a first joining portion 33a of the other joining element 33, and one end of the wire 30b is fixed to a side face portion on the guide pulley 19 side in the first interjoint element 7 of the finger mechanism 2b, and the other end thereof is joined to a second joining portion 33b of the other joining element 33.

Figure 6:
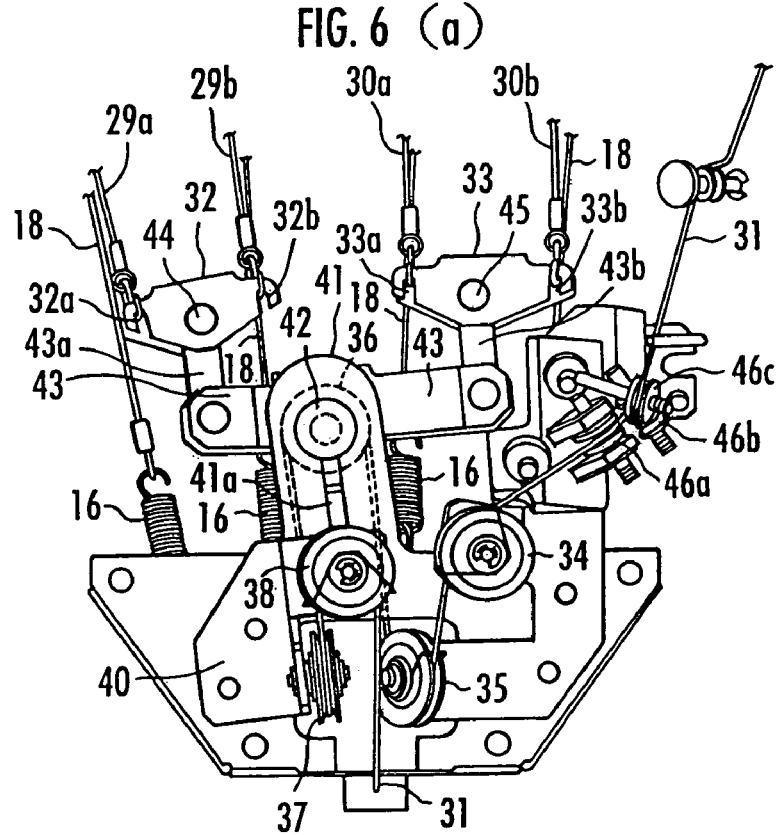
FIGS. 6(a) and 6(b) are views for explaining an actuation of the substantial part of the multi-finger hand device of FIG. 1.
Figure 6:
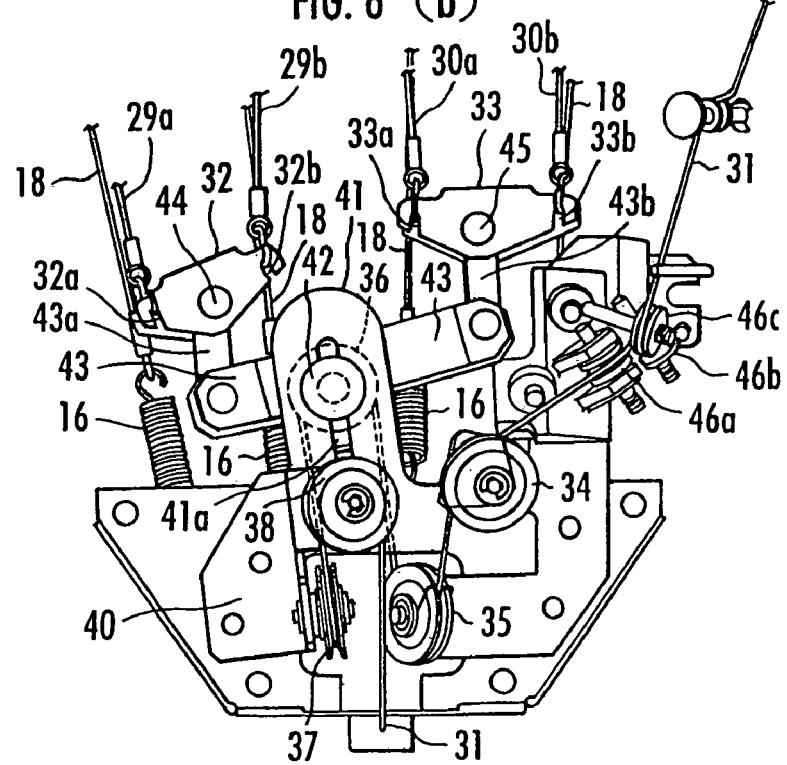

As shown in FIGS. 1, 2 and 6, the joining elements 32 and 33 are held inside of the hand 3 as follows. Specifically, a bracket 40 extending in the width direction of the hand 3 whose tip end bends is provided fixedly at a position closer to a wrist in the element for back of hand formation 1b of the hand 3, and from the bracket 40, an auxiliary element 41 is provided extensionally toward interspace between the finger mechanisms 2c and 2d. On the center line of this auxiliary element 41, a kerf 41a extending in the anteroposterior direction is formed, and a spindle 42 having a shaft center in the vertical direction is engaged in this kerf 41a. The spindle 42 is rendered movable along the kerf 41a in the anteroposterior direction. Furthermore, a holding element 43 extending in the width direction of the hand 3 is attached to the spindle 42. The holding element 43 is rendered rockable around the spindle 42, and movable along the kerf 41a in the anteroposterior direction together with the spindle 42. Then, link elements 43a and 43b are joined from both ends of the holding element 43, and the joining elements 32 and 33 are rockably joined to tip ends of the respective link elements 43a and 43b via spindles 44 and 45.

Furthermore, in the joining element 32, the distance from the spindle 44 to the first joining portion 32a is rendered smaller than that from the spindle 44 to the second joining portion 32b, so that with the spindle 44 serving as a supporting point, the supporting point is closer to the first joining portion 32a. In the joining element 33, the distance from the spindle 45 to the first joining portion 33a is rendered smaller than that from the spindle 45 to the second joining portion 33b, so that with the spindle 45 serving as a supporting point, the supporting point is closer to the first joining portion 33a. Furthermore, in the holding element 43, the distance from the spindle 42 thereof to the spindle 44 of the joining element 32 on the side of the finger mechanisms 2d and 2e is rendered smaller than the distance from the spindle 42 to the spindle 45 of the joining element 33 on the side of the finger mechanisms 2b and 2c.

This structure enables the joining elements 32 and 33 to move together with the holding element 43 in the anteroposterior direction, and to rock around the spindle 42 between these joining elements 32 and 33.

One end of the wire 31, as shown in FIG. 2, is fixed to a tip end of the second interjoint element 22 of the finger mechanism 2a inside of the finger mechanism 2a, and from the tip end, the wire 31 goes through an outer periphery of the joint shaft 24a of the second joint 24 on the belly side of the finger mechanism 2a (an outer periphery of the joint shaft 24a on the left side in FIG. 2), and an outer periphery of a guide pulley 46a attached to the joint shaft 23a so as to freely rotate around the joint shaft 23a of the first joint 23 inside of the finger mechanism 2a, and is drawn from the fixing element 20 into the hand 3. In this case, inside of the first interjoint element 21, two guide pulley 46b and 46c for guiding the wire 31 from the tip end of the second interjoint element 22 to the guide pulley 46a while orienting the wire 31 to a required direction are supported rotatably, and the part of the wire 31 between the joint shaft 24a and the guide pulley 46a is also wound around the guide pulleys 46b and 46c. The guide pulley 46b is provided at such a position that a force in a bending direction of the finger mechanism 2a acts on the first interjoint element 21 around the shaft center of the joint shaft 23a of the first joint 23 when the part of the wire 31 which is drawn from the fixing element 20 is pulled. Similarly, the guide pulley 46c is provided at such a position that the force in the bending direction of the finger mechanism 2a acts on the second interjoint element 22 around the shaft center of the joint shaft 24a of the second joint 24 when the part of the wire 31 which is drawn from the fixing element 20 is pulled.

Furthermore, the wire 31 drawn from the fixing element 20 of the finger mechanism 2a sequentially goes through outer peripheries of the pulleys 34 and 35, which are rotatably supported by the bracket 40 in required postures at positions at the rear of the pulley 36 and closer to the fixing element 20, and thereafter, is wound around an outer periphery on the front side in the pulley 36, which is rotatably supported concentrically with the spindle 42 by the holding element 43. The pulley 36 is equivalent to the pulley element according to the present invention.

Furthermore, the wire 31, after being drawn rearward from the pulley 36, goes through outer peripheries of the pulleys 37 and 38, which are rotatably supported by the bracket 40 in required postures at the rear of the pulley 36, and penetrates the inside of the wrist base 4 to be introduced to the inside of the arm 5, as shown in FIG. 4.

Incidentally, the pulleys 34, 35, 37 and 38 are intended to regulate the orientation and wiring position of the wire 31, and mere rod-like elements may be fixed to the bracket 40 instead of these pulleys 34, 35, 37 and 38 as long as the elements have a relatively small friction with the wire 31, and the wire 31 may be wound around outer peripheries of these rod-like elements. This is similar with respect to the guide pulleys 46a to 46c provided in the finger mechanism 2a, and further similar with respect to the guide pulleys 19 of the finger mechanisms 2b to 2e around which the wires 29a, 29b, 30a and 30b and the wires 18 relating to the biasing means are wound.

Figure 5:
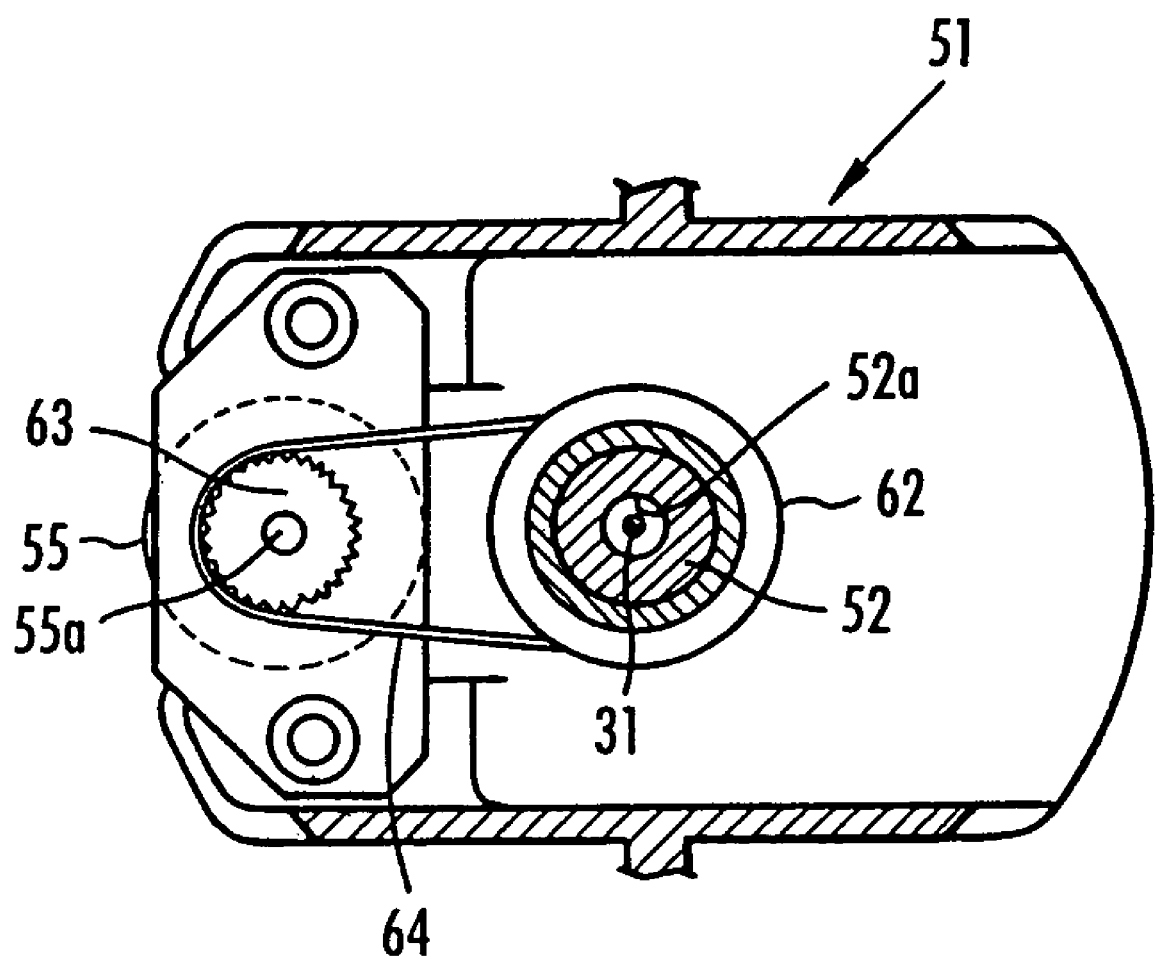
FIG. 5 is a cross-sectional view taken along the line IV—IV of FIG. 4.

Next, the substantial part structure of the arm 5 to which the wire 31 drawn from the side of the hand 3 is introduced will be described in reference to FIGS. 4 and 5.

As shown in FIG. 4, the arm 5 is provided with a machine frame 51 on which an actuator or the like is mounted at a tip end inside of an arm housing 50 which forms an outer peripheral face portion thereof. Then, a joining shaft 52 which joins the wrist base 4 of the hand 3 is rotatably supported by this machine frame 51 via a pair of bearings 53 and 54 with a shaft center thereof oriented toward a longitudinal direction of the arm 5, and on the rear side of the joining shaft 52, a driving motor 55 for rotating the hand 3 with respect to the arm 5 (hereinafter referred to as a motor for hand rotation 55) and the driving motor 56 for pulling the wire 31 (hereinafter referred to as the motor for finger driving 56) are mounted.

A front end of the joining shaft 52 is projected from the inside of the arm housing 50, and the wrist base 4 of the hand 3 is joined to the projected portion via a screw 57 concentrically with the joining shaft 52. This enables the hand 3 to rotate around a shaft center of the joining shaft 52 integrally with the joining shaft 52. Furthermore, a through-hole 52a is drilled in a shaft center portion of the joining shaft 52, and the wire 31 drawn from the hand 3 side is derived to the rear of the joining shaft 52 through the through-hole 52a.

Furthermore, at the rear of the joining shaft 52, there is provided a winding-up shaft 58 extending in a direction orthogonal to the shaft center of the joining shaft 52, and this winding-up shaft 58 is rotatably supported by the machine frame 51 at the both ends. Then, the wire 31 derived from the through-hole 52a of the joining shaft 52 is locked onto this winding-up shaft 58, and by rotating the winding-up shaft 58 in a predetermined direction, the wire 31 is wound around the winding-up shaft 58 to be pulled.

The motor for finger driving 56 is mounted on the machine frame 51 side by side and in parallel with the winding-up shaft 58, and a driving gear 59 attached to a rotation driving shaft 56a of the motor for finger driving 56 is connected to a driven pulley 60 attached to the winding-up shaft 58 via a belt element 61. Accordingly, the winding-up shaft 58 is rotationally driven, and the wire 31 is wound around the winding-up shaft 58 or the winding is released by normal rotation actuation and reverse rotation actuation of this motor for finger driving 56.

Incidentally, the part of the wire 31 inside of the arm 5 is equivalent to the driving wire according to the present invention.

Furthermore, a driven pulley 62 is attached by insertion to an outer peripheral portion of the joining shaft 52 so as to freely rotate integrally with the joining shaft 52. Then, the motor for hand rotation 55 is mounted on the machine frame 51 in a posture parallel to the joining shaft 52, and as shown in FIG. 5, a gear 63 attached to a rotation driving shaft 55a of the motor for hand rotation 55 is connected to the driven pulley 62 of the joining shaft 52 via a belt element 64. Accordingly, the joining shaft 52 is rotationally driven by normal rotation actuation and reverse rotation actuation of the motor for hand rotation 55, and herewith, the hand 3 rotates around the shaft center of the joining shaft 52 together with the wrist base 4 joined to the joining shaft 52.

Incidentally, according to the present embodiment, the joining shaft 52 and the wire 31 are made of an insulating material such as a resin material. Furthermore, the arm housing 50, including a part 50a in which it contacts the wrist base 4 (refer to FIG. 4), is made of a resin material. Accordingly, the arm 5 and the hand 3 are insulated electrically.

Furthermore, inside of the housing 50, there is provided an encoder for detecting a rotational position of the motor for hand rotation 55 (this is equivalent to a rotational position of the hand 3 with respect to the arm 5) and a rotational position of the motor for finger driving 56 (this is equivalent to a winding-up amount of the wire 31 onto the winding-up shaft 58), the drawing of which is omitted. Then, control over the actuation of the motor for hand rotation 55 and the motor for finger driving 56 is performed by a controller not shown in the figure on the basis of detection data of the encoder or the like.

Next, the actuation of the multi-finger hand device 1 according to the present embodiment will be described. Firstly, the fundamental actuation of the multi-finger hand device 1 will be described. Among the finger mechanisms 2a to 2e, the finger mechanisms 2b to 2e stay stretched by the biasing forces of the springs 16 corresponding to the respective finger mechanisms as shown in FIGS. 1 and 2 at normal time. Similarly, the finger mechanism 2a, as shown in FIGS. 1 and 2, stays stretched by the biasing force of the spring 26 and the other spring not shown in the figure at normal time.

In this state, when the motor for finger driving 56 inside of the arm 5 is actuated to rotationally drive the winding-up shaft 58 toward a winding-up direction of the wire 31 extending from the hand 3 into the arm 5, the wire 31 is pulled in a direction indicated by an arrow y3 in FIGS. 1 and 2. At this time, the tip end of the second interjoint element 22 of the finger mechanism 2a is pulled toward the bending side of the finger mechanism 2a via the wire 31, and the pulley 36 is pulled rearward. Then, basically, the holding element 43 and the joining elements 32 and 33, together with this pulley 36, move rearward from a state shown in FIG. 6(a) to that shown in FIG. 6(b), and consequently, the first interjoint elements 7 and 7 of the finger mechanisms 2d and 2e are pulled toward the bending side of the finger mechanisms 2d and 2e via the wires 29a and 29b, and the first interjoint elements 7 and 7 of the finger mechanisms 2b and 2c are pulled toward the bending side of the finger mechanisms 2b and 2c via the wires 30a and 30b. Thereby, all of the finger mechanisms 2a to 2e are bent so as to hold an object, which is not shown in the figure, therebetween. In other words, the wire 31 is pulled from the hand 3 side to the arm 5 side by the driving force of the single motor for finger driving 56 to be wound up around the winding-up shaft 58, thereby performing the bending operations of the five finger mechanisms 2a to 2e collectively. Thereby, work such as holding an object can be performed using the finger mechanisms 2a to 2e.

On the other hand, in the multi-finger hand device 1 according to the present embodiment, in the bending operations of the finger mechanisms 2a to 2e as described above, when the holding element 43 and the joining elements 32 and 33 move rearward, the holding member 43 is inclined to move the joining element 32 on the side of the finger mechanisms 2d and 2e slightly earlier, since the distance from the spindle 42 of the holding element 43 to the spindle 44 of the joining element 32 on the side of the finger mechanisms 2d and 2e is rendered smaller than the distance from the spindle 42 to the spindle 45 of the joining element 33 on the side of the finger mechanisms 2b and 2c, as is shown in FIG. 6(b). Furthermore, in the joining elements 32 and 33, since the distances from the respective spindles 44 and 45 to the first joining portions 32a and 33a are rendered smaller than the distances from the respective spindles 44 and 45 to the second joining portions 32b and 33b, the respective joining elements 32 and 33 are inclined, so that the wire 29a is pulled with an earlier timing than the wire 29b and the wire 30a is pulled with an earlier timing than the wire 30b. Thereby, the finger mechanisms 2e, 2d, 2c and 2b can be continuously bent with a slight delay in this sequence to thereby imitate a gripping operation in a natural form like that of a human hand. Incidentally, although such a bending operation sequence of the finger mechanisms 2a to 2e can be realized by setting the biasing forces of the springs 16 so as to be decreased in the order of 2e, 2d, 2c and 2b, the springs 16 of plural types having different biasing forces need to be used, which not only makes the handling troublesome but causes a possibility of improper mounting. In contrast, according to the present embodiment, the bending and stretching operation sequence of the finger mechanisms can be set mechanically by the supporting point position corresponding to the spindle 42 of the holding element 43 and the supporting point positions corresponding to the spindles 44 and 45 of the respective joining elements 32 and 33, so that the bending and stretching operation sequence of the finger mechanisms imitating a human hand can be achieved more easily than the case using the springs 16 having plural types of biasing forces.

In addition, according to the multi-finger hand device 1 of the present embodiment, even if any one of the finger mechanisms touches an object to be held and is disabled to bend further, the bending operations of the other finger mechanisms can be performed. Specifically, during the bending operations of the finger mechanisms 2a to 2e, for example, even if the finger mechanism 2e touches an object not shown in the figure and is disabled to bend further, as long as the finger mechanism 2d next to this finger mechanism 2*e* can bend further, the joining element 32, to which the wire 29*a* joined to this finger mechanism 2*e* is joined, can absorb an amount in which the wire 29*a* cannot be pulled, by balance-like inclination via the spindle 44, and can move toward the rear side while pulling the wire 29*b* of the finger mechanism 2*d*.

Furthermore, similarly, the joining element 33, to which the wires 30*a* and 30*b* provided extensionally from the finger mechanisms 2*b* and 2*c* are joined, can move toward the rear side while inclining via the spindle 45 as long as at least any one of the finger mechanisms 2*b* and 2*c* can bend further. Furthermore, as for the finger mechanism 2*a*, as long as it can bend further, by winding up the wire 31 around the winding-up shaft 58 inside of the arm 5, the length of a part from the pulley 34 of the wire 31 to the tip end of the finger mechanism 2*a* is decreased, so that the bending operation of the finger mechanism 2*a* is performed.

Still furthermore, when the finger mechanism 2*a* cannot bend any more, the length of the part of the wire 31 from the pulley 34 to the tip end of the finger mechanism 2*a* does not vary, however, by winding up the wire 31 around the winding-up shaft 58 inside of the arm 5, the pulley 36 moves toward the rear side together with the joining elements 32 and 33 on both sides thereof via the holding element 43. Therefore, the bending operations of the finger mechanisms 2*b* to 2*e* can be performed without any problem.

In this way, even when any one of the finger mechanisms is disabled to bend, since the joining elements 32 and 33 can be moved toward the arm 5 side together with the pulley holding element 43 and the pulley 36 while winding up the wire 31 around the winding-up shaft 58, the bending operations of the other finger mechanisms which can bend can be performed without any problem.

Furthermore, in the bending operations of the finger mechanisms 2*a* to 2*e*, even when any two of the finger mechanisms touch an object to be held or the like and thereby are disabled to bend further, the bending operations of the other finger mechanism can be performed. For example, when both the finger mechanisms 2*c* and 2*d* among the finger mechanisms 2*b* to 2*e* are disabled to bend, both the respective joining elements 32 and 33 can incline via the spindles 44 and 45 to absorb amounts in which the wires 29*b* and 30*a* cannot be pulled and move rearward while pulling the wires 29*a* and 30*b*. Meanwhile, as for the finger mechanism 2*a*, by the winding-up of the wire 31 around the winding-up shaft 58, the length of the part of the wire 31 from the pulley 34 to the tip end of the finger mechanism 2*a* is decreased, so that the bending operation of the finger mechanism 2*a* is performed. This is similar in a case where a pair of the finger mechanisms 2*b* and 2*d*, a pair of the finger mechanisms 2*b* and 2*e*, or a pair of the finger mechanisms 2*c* and 2*e* are disabled to bend.

Furthermore, in a case where the finger mechanism 2*a* and any one of the finger mechanisms 2*b* to 2*e* are disabled to bend, as in the above-mentioned cases, since the joining elements 32 and 33 can also move rearward together with the pulley 36, the other finger mechanisms can perform the bending operations by the winding-up of the wire 31 around the winding-up shaft 58.

Furthermore, in a case where a pair of the finger mechanisms 2*b* and 2*c*, or a pair of the finger mechanisms 2*d* and 2*e* are disabled to bend further, the other finger mechanisms can also perform the bending operations. For example, in the case where the pair of the finger mechanisms 2*b* and 2*c* are disabled to bend, since neither of the wires 30*a* and 30*b* can be pulled, the joining element 33 joined to the wires 30*a* and 30*b* cannot move rearward. On the other hand, the holding element 43 holding both of the joining elements 32 and 33 via the link elements 43*a* and 43*b* can absorb an amount in which the joining element 33 cannot move, by balance-like inclination via the spindle 42 to thereby move toward the rear side (the arm 5 side). Thereby, the joining element 32 joined to the wires 29*a* and 29*b*, which can be pulled, moves toward the rear side by the inclined holding element 43. In this way, even when the pair of the finger mechanisms 2*b* and 2*c* are disabled to bend, the bending operations of the other finger mechanisms 2*a*, 2*d* and 2*e* can be performed while winding up the wire 31 around the winding-up shaft 58 inside of the arm 5. This is similar in the case where the pair of the finger mechanisms 2*d* and 2*e* is disabled to bend.

Similarly, in a case where any three finger mechanisms of the finger mechanisms 2*a* to 2*e* are disabled to bend further, the two remaining finger mechanisms can also perform the bending operations, and furthermore, in a case where any four finger mechanisms of the finger mechanisms 2*a* to 2*e* are disabled to bend further, the bending operation of the one remaining mechanism can also be performed. In this case, in a case where the finger mechanism 2*a* and any three finger mechanisms of the finger mechanisms 2*b* to 2*e* are disabled to bend, basically, the one remaining finger mechanism can perform the bending operation by rocking the holding element 43. Furthermore, in a case where the four finger mechanisms 2*b* to 2*e* except for the finger mechanism 2*a* are disabled to bend, the holding element 43, the joining elements 32 and 33 supported pivotally by the same, and the pulley 36 are disabled to move rearward, however, by the winding-up of the wire 31 around the winding-up shaft 58, the length of the part of the wire 31 from the pulley 34 to the tip end of the finger mechanism 2*a* is decreased, so that the bending operation of the finger mechanism 2*a* is performed.

As described above, in the multi-finger hand device 1 according to the present embodiment, the wire 31 is wound up around the winding-up shaft 58 by the driving force of the single motor for finger driving 56, so that the bending operations of all the finger mechanisms 2*a* to 2*e* can be performed collectively. Accordingly, instead of providing the actuator for operating each of the finger mechanisms 2*a* to 2*e*, work such as holding an object not shown in the figure can be performed by the five finger mechanisms 2*a* to 2*e* with a small number of actuators. In addition, in this case, even when any of the finger mechanisms 2*a* to 2*e* touches an object or the like, and is disabled to bend further, since the bending operations of the other finger mechanisms can be performed, the holding of the object by the finger mechanisms 2*a* to 2*e* can be securely performed without any problem.

Incidentally, in the above-mentioned description, the bending operations of the finger mechanisms 2*a* to 2*e* from the stretching state are described, however, a similar effect can be brought about in the case where the finger mechanisms 2*a* to 2*e* are stretched from the bending state. Specifically, for example if a pulling force of the wire 31 (a winding-up force around the winding-up shaft 58) by the motor for finger driving 56 is released from the state in which the finger mechanisms 2*a* to 2*e* are bent, basically, the finger mechanisms 2*b* to 2*e* stretch by the biasing forces of the springs 16 corresponding to the respective finger mechanisms, while the finger mechanism 2*a* stretches by the biasing forces of the spring 26 and the other spring not shown in the figure. At this time, even if any of the finger mechanisms 2*a* to 2*e* touches an obstacle or the like and is disabled to stretch further, the other finger mechanisms 2*a* to 2*e* can stretch without any problem by the movement of the joining elements 32 and 33 and the pulley 36 in the anteroposterior direction, and the rocking of the holding element 43 holding the same.

Furthermore, in the multi-finger hand device 1 according to the present embodiment, by actuating the motor for hand rotation 55 inside of the arm 5, the hand 3 is rotated around the shaft center of the joining shaft 52 together with the joining shaft 52. At this time, since the wire 31 extending from the hand 3 side to the inside of the arm 5 extends along the shaft center of the joining shaft 52 which is a rotation shaft center of the hand 3, the hand 3 rotates without pulling the wire 31. Therefore, the hand 3 can be rotated with respect to the arm 5 without any problem, not affecting the bending and stretching state of the finger mechanisms 2a to 2e.

Furthermore, in the multi-finger hand device 1 according to the present embodiment, since the part on the tip end side from the second joint 11 of each of the finger mechanisms 2b to 2e except for the finger mechanism 2a (the part made of the second interjoint element 8, the third interjoint element 9, the third joint 12, and the link arm 15) is identical to each other in shape and size of the respective components, spares thereof can be shared by each other, and the number of types of components required for the multi-finger hand device 1 is reduced, which makes the component management easier.

Furthermore, in the multi-finger hand device 1 according to the present embodiment, with regard to each of the finger mechanisms 2b to 2e, through the link mechanism 13, by rotating the first interjoint element 7 closest to the hand 3 around the shaft center of the joint shaft 10a of the first joint 10 with respect to the fixing element 6, the second interjoint element 8 and the third interjoint element 9 conjunctionally rotate with respect to the first interjoint element 7 and the second interjoint element 8, respectively, so that the bending and stretching of each of the finger mechanisms 2b to 2e can be performed. Therefore, in the wires 29a and 29b, the length from the joining element 32 to fixing points with respect to the finger mechanisms 2d and 2e can be shortened, and similarly, in the wires 30a and 30b, the length from the joining element 33 to fixing points with respect to the finger mechanisms 2b to 2c can be shortened. Accordingly, the whole required length of these wires 29a, 29b, 30a and 30b is shortened, which is advantageous in view of cost.

Furthermore, in the multi-finger hand device 1 according to the present embodiment, since the hand 3 is electrically insulated with respect to the arm 5 as described above, even if the hand 3 is put into water, current flowing in the electrical components such as the motors 55 and 56 inside of the arm 5 does not leak to the hand 3 side. Consequently, the multi-finger hand device 1 allows the work of holding an object in water or the like to be performed without any problem.

Incidentally, the present invention is not limited to the above-mentioned embodiment, but for example, the following modified embodiment is also possible. According to the above-mentioned embodiment, although the finger mechanisms 2a to 2e are designed to be biased to the stretching side, they may be designed to be biased to the bending side. The embodiment of this case can be configured by changing the multi-finger hand device 1 according to the above-mentioned embodiment as follows, for example. Specifically, each of the finger mechanisms 2b to 2e comprising the link mechanism 13 is biased to the bending side of the respective finger mechanisms 2b to 2e, for example, by a power spring provided in the first joint 10 or the like instead of connecting the spring 16 to the first interjoint element 7. Then, the wires 29a, 29b, 30a and 30b extensionally provided from the first interjoint elements 7 of the respective finger mechanisms 2b to 2e are extended to the hand 3 side via the outer peripheries on the lower side of the corresponding guide pulleys 19 of the respective finger mechanisms 2b to 2e (the outer peripheries closer to the face portions on the back side of respective finger mechanisms 2b to 2e). Furthermore, the finger mechanism 2a is biased to the bending side, for example, by power springs provided in the first and second joints 23 and 24, respectively or the like, instead of biasing to the stretching side by the spring 26 and the other spring not shown in the figure. Then, a wiring route of the wire 31 inside of the finger mechanism 2a is adjusted so as to stretch the finger mechanism 2a when the wire 31 provided extensionally from the tip end of the finger mechanism 2a is pulled (for example, the wire 31 is wired so as to be taken along the face portion on the back side of the finger mechanism 2a).

The structures other than the foregoing may be identical to those of the multi-finger hand device 1 according to the above-mentioned embodiment. When the multi-finger hand device is configured in this manner, by pulling the wire 31 to the inside of the arm 5, the stretching operations of the finger mechanisms 2a to 2e are performed collectively. At this time, even if any of the finger mechanisms 2a to 2e touches an object or the like and is disabled to stretch, the stretching operations of the remaining finger mechanisms can be performed by the actuation similar to that in the above-mentioned embodiment.

Furthermore, in the above-mentioned embodiment, the bending operations of the finger mechanisms 2a to 2e are performed by introducing the wire 31 joined to the finger mechanism 2a to the inside of the arm 3 and pulled by the motor for finger driving 56, however, by fixing the end of the wire 31 derived from the pulley 38 to the hand 3 and pulling an intermediate portion of the wire 31, the bending operations of the finger mechanisms 2a to 2e can also be performed. In this case, for example, the pulley 37 in the above-mentioned embodiment is held rotatably by the pulley holding member which is movable in the anteroposterior direction, and the wire element is drawn from this holding element 43 to the inside of the arm 5. Then, this wire element is pulled by the actuator provided inside of the arm 5, so that the bending operations of the finger mechanisms 2a to 2e can be performed.

Furthermore, according to the above-mentioned embodiment, the finger mechanisms 2b to 2e are provided with the link mechanisms 13, and by pulling the wires 29a, 29b, 30a, and 30b provided extensionally from the first interjoint elements 7 of the respective finger mechanisms 2b to 2e, and rotating the first interjoint elements 7 around the shaft center of the first joint shafts 10a of the first joints 10, the second interjoint element 8 and the third interjoint element 9 are conjunctionally rotated, so that the bending and stretching operations of the respective finger mechanisms 2b to 2e are performed, while it is also possible to perform the bending and stretching operations of the respective finger mechanisms 2b to 2e, for example, by pulling the wire elements provided extensionally from the second interjoint elements 8 of the respective finger mechanisms 2b to 2e to rotate the second interjoint elements 8. In this case, for example, one end of each of the wires 29a and 29b in the above-mentioned embodiment is fixed to the second interjoint element 8 of each of the finger mechanisms 2d and 2e at a position closer to the belly thereof, and one end of each of the wire 30a and 30b is fixed to the second interjoint element 8 of each of the finger mechanisms 2b and 2c at a position closer to the belly thereof. Then, by moving the joining elements 32 and 33 toward the rear side (the arm 5 side) to pull the wires 29a, 29b, 30a and 30b, the second interjoint element 8 and the first interjoint element 7 of each of the finger mechanisms 2b to 2e are rotated around the joint shafts of the second joint 11 and the first joint 10, respectively. Furthermore, the first interjoint element 7 and the third interjoint element 9 of each of the finger mechanisms 2b to 2e may be joined by the link arm 15 according to the above-mentioned embodiment so as to rotate the third interjoint element 9 around a shaft center of the joint shaft 12a of the third joint 12 in conjunction with the rotation of the second interjoint element 8.

Furthermore, in the above-mentioned embodiment, the multi-finger hand device 1 provided with the five finger mechanisms 2a to 2e to imitate a human hand is described, however, the present invention can naturally be applied to, for example, a multi-finger hand device provided with three or four finger mechanisms.

INDUSTRIAL APPLICABILITY

As described above, the present invention is useful as a hand device of a robot such as a humanoid, which performs various kinds of work by a plurality of finger mechanisms provided extensionally from a hand.

The invention claimed is:

1. A multi-finger hand device comprising:
a hand attached to a tip end of an arm;
at least four or more finger mechanisms provided extensionally from the hand, each of the plurality of finger mechanisms is structured to sequentially connect a plurality of interjoint elements via finger joints;
biasing means for biasing the respective finger mechanisms to any one of a stretching direction and a bending direction;
wire elements provided extensionally from the respective finger mechanisms to a hand side; and
driving means for performing bending operations or stretching operations of the finger mechanisms by pulling the wire elements provided extensionally from the respective finger mechanisms against biasing forces of the biasing means;
wherein the driving means comprises:
two joining elements each having a pair of joining portions wherein at least four finger mechanisms of the plurality of finger mechanisms are classified into two pairs and each of the pair of joining portions joins an end on the hand side of each of the two wire elements provided extensionally from the two finger mechanisms of each of the two pairs with a space left therebetween,
a holding element which can move in a pulling direction of the wire elements provided extensionally from the four finger mechanisms respectively and can rock around a supporting point provided between the two joining elements; and
a plurality of link elements each holding rockably each of the two joining elements via a supporting point provided between the pair of joining portions and being joined rockably to the holding element;
wherein when the bending operations or the stretching operations of the four finger mechanisms are performed, the wire elements provided extensionally from the four finger mechanisms are pulled by moving the holding element; and
wherein the supporting points each provided between the pair of joining portions in each of the joining elements are located closer to any one of the joining portions.

2. The multi-finger hand device according to claim 1, comprising at least five or more said finger mechanisms, wherein:
the driving means comprises a pulley element onto which the wire element provided extensionally from the one finger mechanism other than the four finger mechanisms is wound and which is held rotatably by the holding element between the two joining elements; and when the bending operations or the stretching operations of the four finger mechanisms and the one other finger mechanism are performed, the wire element provided extensionally from the one other finger mechanism is pulled in such a direction that the pulley element moves in a pulling direction of the wire elements provided extensionally from the four finger mechanisms together with the holding element.

3. The multi-finger hand device according to claim 2, wherein at least one finger mechanism of the plurality of the finger mechanisms has a link mechanism joined to the plurality of interjoint elements of the finger mechanism, so that rotational operations around the other finger joints are performed in conjunction with a rotational operation of the interjoint element continued into the finger joint closest to the hand around the finger joint, and the wire element provided extensionally from the finger mechanism is provided extensionally from the interjoint element closest to the hand.

4. The multi-finger hand device according to claim 2, wherein the two or more interjoint elements of each of the two or more finger mechanisms among the plurality of finger mechanisms have an identical structure.

5. The multi-finger hand device according to claim 2, wherein:
the hand is provided rotatably around a shaft center extending in a substantially longitudinal direction of the arm;
the driving means comprises at least one driving wire element provided extensionally from the hand to the inside of the arm, and an actuator for applying to the driving wire element a driving force for pulling the driving wire element toward the inside of the arm, the driving means transmitting the force of pulling the wire elements provided extensionally from the respective finger mechanisms from the actuator to the hand side via the driving wire element; and
the driving wire element is arranged into the arm along the rotation shaft center of the hand.

6. The multi-finger hand device according to claim 5, wherein the arm and the hand are insulated electrically, and the driving wire element is formed of an insulating material.

7. The multi-finger hand device according to claim 1, wherein the supporting point provided between the two joining elements is located closer to any one of the joining elements.

8. The multi-finger hand device according to claim 7, wherein at least one finger mechanism of the plurality of the finger mechanisms has a link mechanism joined to the plurality of interjoint elements of the finger mechanism, so that rotational operations around the other finger joints are performed in conjunction with a rotational operation of the interjoint element continued into the finger joint closest to the hand around the finger joint, and the wire element provided extensionally from the finger mechanism is provided extensionally from the interjoint element closest to the hand.

9. The multi-finger hand device according to claim 7, wherein the two or more interjoint elements of each of the two or more finger mechanisms among the plurality of finger mechanisms have an identical structure.

10. The multi-finger hand device according to claim 7, wherein:
the hand is provided rotatably around a shaft center extending in a substantially longitudinal direction of the arm;
the driving means comprises at least one driving wire element provided extensionally from the hand to the inside of the arm, and an actuator for applying to the driving wire element a driving force for pulling the driving wire element toward the inside of the arm, the driving means transmitting the force of pulling the wire elements provided extensionally from the respective finger mechanisms from the actuator to the hand side via the driving wire element; and
the driving wire element is arranged into the arm along the rotation shaft center of the hand.

11. The multi-finger hand device according to claim 10, wherein the arm and the hand are insulated electrically, and the driving wire element is formed of an insulating material.

12. The multi-finger hand device according to claim 1, wherein at least one finger mechanism of the plurality of the finger mechanisms has a link mechanism joined to the plurality of interjoint elements of the finger mechanism, so that rotational operations around the other finger joints are performed in conjunction with a rotational operation of the interjoint element continued into the finger joint closest to the hand around the finger joint, and the wire element provided extensionally from the finger mechanism is provided extensionally from the interjoint element closest to the hand.

13. The multi-finger hand device according to claim 1, wherein the two or more interjoint elements of each of the two or more finger mechanisms among the plurality of finger mechanisms have an identical structure.

14. The multi-finger hand device according to claim 1, wherein:
the hand is provided rotatably around a shaft center extending in a substantially longitudinal direction of the arm;
the driving means comprises at least one driving wire element provided extensionally from the hand to the inside of the arm, and an actuator for applying to the driving wire element a driving force for pulling the driving wire element toward the inside of the arm, the driving means transmitting the force of pulling the wire elements provided extensionally from the respective finger mechanisms from the actuator to the hand side via the driving wire element; and
the driving wire element is arranged into the arm along the rotation shaft center of the hand.

15. The multi-finger hand device according to claim 14, wherein the arm and the hand are insulated electrically, and the driving wire element is formed of an insulating material.

16. A multi-finger hand device comprising:
a hand attached to a tip end of an arm;
a plurality of finger mechanisms provided extensionally from the hand, each of the plurality of finger mechanisms being structured to sequentially connect a plurality of interjoint elements via finger joints;
biasing means for biasing the respective finger mechanisms to any one of a stretching direction and a bending direction;
wire elements provided extensionally from the respective finger mechanisms to a hand side; and driving means for performing bending operations or stretching operations of the finger mechanisms by pulling the wire elements provided extensionally from the respective finger mechanisms against biasing forces of the biasing means, wherein the driving means comprises:
a joining element having a pair of joining portions which join ends on the hand side of the two wire elements provided extensionally from at least two finger mechanisms of the plurality of finger mechanisms respectively with a space left therebetween, and
a holding element which rockably holds the joining element via a supporting point provided between both the joining portions of the joining element and can move in a pulling direction of the two wire elements, and when the bending operations or the stretching operations of the two finger mechanisms are performed, the wire elements provided extensionally from the two finger mechanisms are pulled by moving the holding element;
at least three or more said finger mechanisms are provided; and
the driving means comprises a pulley element onto which the wire element provided extensionally from the one finger mechanism other than the two finger mechanisms is wound and which is held rotatably by the holding element; and when the bending operations or the stretching operations of the two finger mechanisms and the one other finger mechanism are performed, the wire element provided extensionally from the one other finger mechanism is pulled in such a direction that the pulley element moves in a pulling direction of the wire elements provided extensionally from the two finger mechanisms together with the holding element.

17. The multi-finger hand device according to claim 16, wherein the supporting point provided between both the joining portions of the joining element is located closer to any one of the joining portions.

18. The multi-finger hand device according to claim 16, further comprising a plurality of link elements each holding rockably each of the two joining elements via a supporting point provided between the pair of joining portions and being joined rockably to the holding element.

19. The multi-finger hand device according to claim 16, wherein at least one finger mechanism of the plurality of the finger mechanisms has a link mechanism joined to the plurality of interjoint elements of the finger mechanism, so that rotational operations around the other finger joints are performed in conjunction with a rotational operation of the interjoint element continued into the finger joint closest to the hand around the finger joint, and the wire element provided extensionally from the finger mechanism is provided extensionally from the interjoint element closest to the hand.

20. The multi-finger hand device according to claim 16, wherein the two or more interjoint elements of each of the two or more finger mechanisms among the plurality of finger mechanisms have an identical structure.

21. The multi-finger hand device according to claim 16, wherein:
the hand is provided rotatably around a shaft center extending in a substantially longitudinal direction of the arm;
the driving means comprises at least one driving wire element provided extensionally from the hand to the inside of the arm, and an actuator for applying to the driving wire element a driving force for pulling the driving wire element toward the inside of the arm, the driving means transmitting the force of pulling the wire elements provided extensionally from the respective finger mechanisms from the actuator to the hand side via the driving wire element; and the driving wire element is arranged into the arm along the rotation shaft center of the hand.

22. The multi-finger hand device according to claim 21, wherein the arm and the hand are insulated electrically, and the driving wire element is formed of an insulating material.

* * * * *